United States Patent
Furuya

(10) Patent No.: US 8,400,527 B2
(45) Date of Patent: Mar. 19, 2013

(54) IMAGE CAPTURE APPARATUS

(75) Inventor: Kohei Furuya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

(21) Appl. No.: 12/814,125

(22) Filed: Jun. 11, 2010

(65) Prior Publication Data

US 2010/0328487 A1   Dec. 30, 2010

(30) Foreign Application Priority Data

Jun. 30, 2009   (JP) .................. 2009-156324

(51) Int. Cl.
  *H04N 5/76*   (2006.01)
  *H04N 5/262*   (2006.01)
(52) U.S. Cl. ..................... 348/231.6; 348/239
(58) Field of Classification Search ............. 348/231.99, 348/231.3, 231.6, 239
  See application file for complete search history.

(56) References Cited

U.S. PATENT DOCUMENTS

| | | | | |
|---|---|---|---|---|
| 2002/0140827 A1 * | 10/2002 | Okisu et al. | ................ | 348/222.1 |
| 2003/0103158 A1 * | 6/2003 | Barkan et al. | ................ | 348/362 |
| 2005/0041138 A1 * | 2/2005 | Suzuki | ................ | 348/362 |

FOREIGN PATENT DOCUMENTS

| | | | |
|---|---|---|---|
| JP | 10-271427 | | 10/1998 |
| JP | 2002-300372 | | 10/2002 |
| JP | 2004-072308 | | 3/2004 |
| JP | 2004222149 A | * | 8/2004 |
| JP | 2010124412 A | * | 6/2010 |

* cited by examiner

*Primary Examiner* — Jason Whipkey

(74) *Attorney, Agent, or Firm* — Cowan, Liebowitz & Latman, P.C.

(57) ABSTRACT

An image capture apparatus has an image capture unit to capture an object image, an acquisition unit to acquire a developing parameter for image data captured by the image capture unit, an analysis unit to analyze RAW image data generated by the image capture unit, an image composition unit to compose a plurality of RAW image data generated by the image capture unit and generate composite RAW image data, a composition ratio determination unit to determine a composition ratio for a plurality of developing parameters respectively for development of the plurality of RAW image data acquired by the acquisition unit, a parameter composition unit to compose the plurality of developing parameters and generate one composite developing parameter, and a development unit to develop the composite RAW image data using the composite developing parameter.

6 Claims, 6 Drawing Sheets

IMAGE CAPTURE APPARATUS

BACKGROUND OF THE INVENTION

1. Field of the Invention

The present invention relates to an image capture apparatus capable of multiple-exposure image capture.

2. Description of the Related Art

Conventionally, as an image processing apparatus to produce one composite image from plural captured images upon multiple-exposure image capture, an apparatus to record information to restore captured images before composition in tag information of a composite image is proposed (see Japanese Patent Laid-Open No. 2002-300372).

Further, an apparatus to convert captured images before composition using plural image capturing information upon image capture of plural images and perform composition is known (see Japanese Patent Laid-Open No. 10-271427).

However, in these conventional techniques, the image capturing information stored in a header of a composite image is only image capturing information of the first image among the plural captured images.

When only the image capturing information upon image capture for the first image is recorded as the image capturing information stored in the header information of the composite image, it is impossible to find objects in the image capture for the second and the subsequent images and as a result it is impossible to determine a developing parameter appropriate for developing the composite image.

SUMMARY OF THE INVENTION

The present invention has been made in view of the above-described problems, and sets an appropriate developing parameter for an image composed from plural images acquired by multiple-exposure image capture.

According to a first aspect of the present invention, there is provided an apparatus comprising: an image capture unit to capture an object image; an acquisition unit to acquire a developing parameter for image data captured by the image capture unit; an analysis unit to analyze RAW image data generated by the image capture unit; a first composition unit to compose a plurality of RAW image data generated by the image capture unit and generate composite RAW image data; a determination unit to determine a composition ratio for a plurality of developing parameters respectively for development of the plurality of RAW image data acquired by the acquisition unit in accordance with a result obtained from the analysis unit or a user's setting; a second composition unit to compose the plurality of developing parameters acquired by the acquisition unit based on the composition ratio for the plurality of developing parameters determined by the determination unit and generate one composite developing parameter; and a development unit to develop the composite RAW image data composed by the first composition unit using the composite developing parameter generated by the second composition unit.

According to a second aspect, there is provided an apparatus comprising: an image capture unit to capture an object image; an acquisition unit to acquire a developing parameter for image data captured by the image capture unit; a first composition unit to compose a plurality of RAW image data generated by the image capture unit and generate composite RAW image data; a second composition unit to generate information to compose a plurality of developing parameters acquired by the acquisition unit; a recording unit to record the composite RAW image data, the acquired plurality of developing parameters and the information to compose the plurality of developing parameters; an analysis unit to analyze the RAW image data recorded by the recording unit; and a determination unit to determine a composition ratio for the plurality of developing parameters respectively for development of the plurality of RAW image data in accordance with a result obtained from the analysis unit or a user's setting, wherein, when the information to compose the plurality of developing parameters is read, the second composition unit composes the plurality of developing parameters recorded by the recording unit, based on the composition ratio for the plurality of developing parameters determined by the determination unit, and generates one composite developing parameter.

Further features of the present invention will become apparent from the following description of exemplary embodiments with reference to the attached drawings.

DESCRIPTION OF THE EMBODIMENTS

Hereinbelow, embodiments of the present invention will now be described in detail in accordance with the accompanying drawings.

First Embodiment

Figure 1:
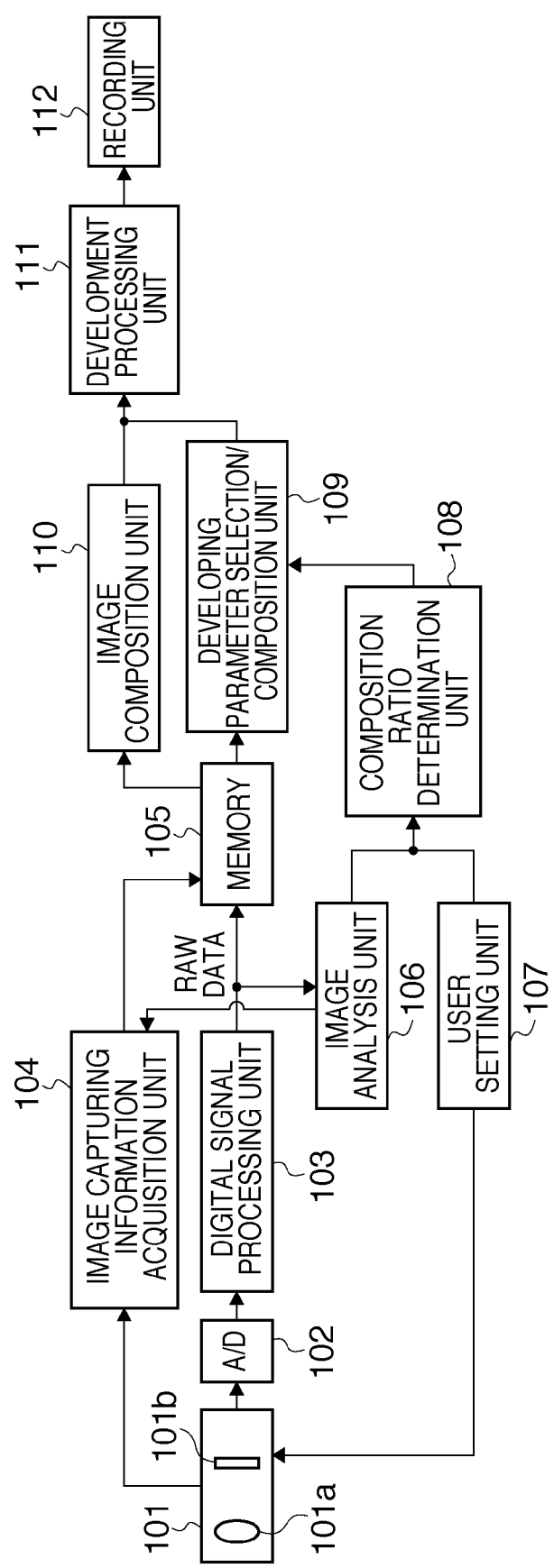
FIG. 1 is a block diagram showing a configuration of an image capture apparatus according to a first embodiment of the present invention.

FIG. 1 is a block diagram showing a configuration of an image capture apparatus according to a first embodiment of the present invention. In FIG. 1, reference numeral 101 denotes an image capture unit to capture an object image. The image capture unit 101 has an imaging lens 101a to form an object image and an image capture device 101b to perform photoelectric conversion on the formed object image and generate an analog image signal. The imaging lens 101a is illustrated as one lens for the sake of convenience of explanation, however, actually, it includes a zoom lens for zooming, a focus lens for focusing, an aperture for light amount control and the like. Numeral 102 denotes an A/D converter to convert an analog image signal outputted from the image capture unit 101 into digital image data. Numeral 103 denotes a digital signal processing unit to generate RAW image data from the digital image data outputted from the A/D converter 102. In the present embodiment, to obtain images by multiple exposure, image capture is performed plural times, and plural RAW image data obtained in the respective image captures are stored into a memory 105 for later composition.

Numeral 104 denotes an image capturing information acquisition unit to acquire image capturing information (information upon image capture) in respective plural image captures for multiple exposure. As image capturing information, a color conversion table set value, a white balance set value, thumbnail information, exposure time, an aperture value, an image capture mode, an ISO film speed value, a shutter speed, a light control correction value, an exposure correction value, lens information, a distance to an object, a flash status and the like can be given. Note that the color conversion table means a table for determination of color balance for development of captured RAW image data. A user setting unit 107 to be described later sets one of color balances for a vivid image, a standard image, a neutral image with suppressed color development, a flesh-color oriented image and the like, in accordance with a user's preference. Further, the white balance set value is set by the user from auto white balance, sunlight, fluorescent light, a tungsten lamp and the like using the user setting unit 107, or by directly inputting a color temperature. Further, the image capturing information includes information on presence/absence of a person's face in a captured image, a face position, a face size and the like obtained by analysis of RAW image data by an image analysis unit 106 to be described later. The image capturing information in the respective plural image captures obtained by the image capturing information acquisition unit 104 are stored in the memory 105.

The image analysis unit 106 analyzes the RAW image data outputted from the digital signal processing unit 103, and detects whether or not a person's face exists in the image, and when it exists, the position of the face, the size of the face and the like. The user setting unit 107 enables the user to set a color conversion table set value, a white balance set value and the like. Numeral 108 denotes a composition ratio determination unit to determine a composition ratio for composition of developing parameters such as the color conversion table set value and the white balance set value for the respective plural image data. A development processing unit 111 performs development processing on RAW image data composed by an image composition unit 110 using a composite developing parameter selected or composed by a developing parameter selection/composition unit 109 to be described later, based on the composition ratio determined by the composition ratio determination unit 108.

Note that the composition ratio determination unit 108 determines the developing parameter composition ratio as follows. For example, a composition ratio for composition of the respective developing parameters for plural captured image data may be simply 1÷number of captured images. Further, it may be arranged such that based on the existence/absence of face detected by the image analysis unit 106 (detection result), the composition ratio for composition of the developing parameters for face-included image data is increased and a composite developing parameter with preference on face is generated. Further, it is possible for the user to explicitly set a developing parameter composition ratio using the user setting unit 107.

The developing parameter selection/composition unit 109 composes a developing parameter for plural captured image data based on the developing parameter composition ratio determined by the composition ratio determination unit 108. Note that, for example, when a composite developing parameter with preference on face is generated as described above, it may be arranged such that a developing parameter for one image data where a face exists is selected as a composite developing parameter without using a developing parameter for image data without face.

The image composition unit 110 composes plural RAW image data captured for multiple exposure. Note that in the image composition by the image composition unit 110, plural RAW image data are composed at a ratio of 1:1 without particularly changing the ratio. The development processing unit 111 performs development processing on the RAW image data composed by the image composition unit 110 using the composite developing parameter generated by the developing parameter selection/composition unit 109. Numeral 112 denotes a recording unit to record the image data development-processed by the development processing unit 111 in a memory card or the like.

Figure 2:
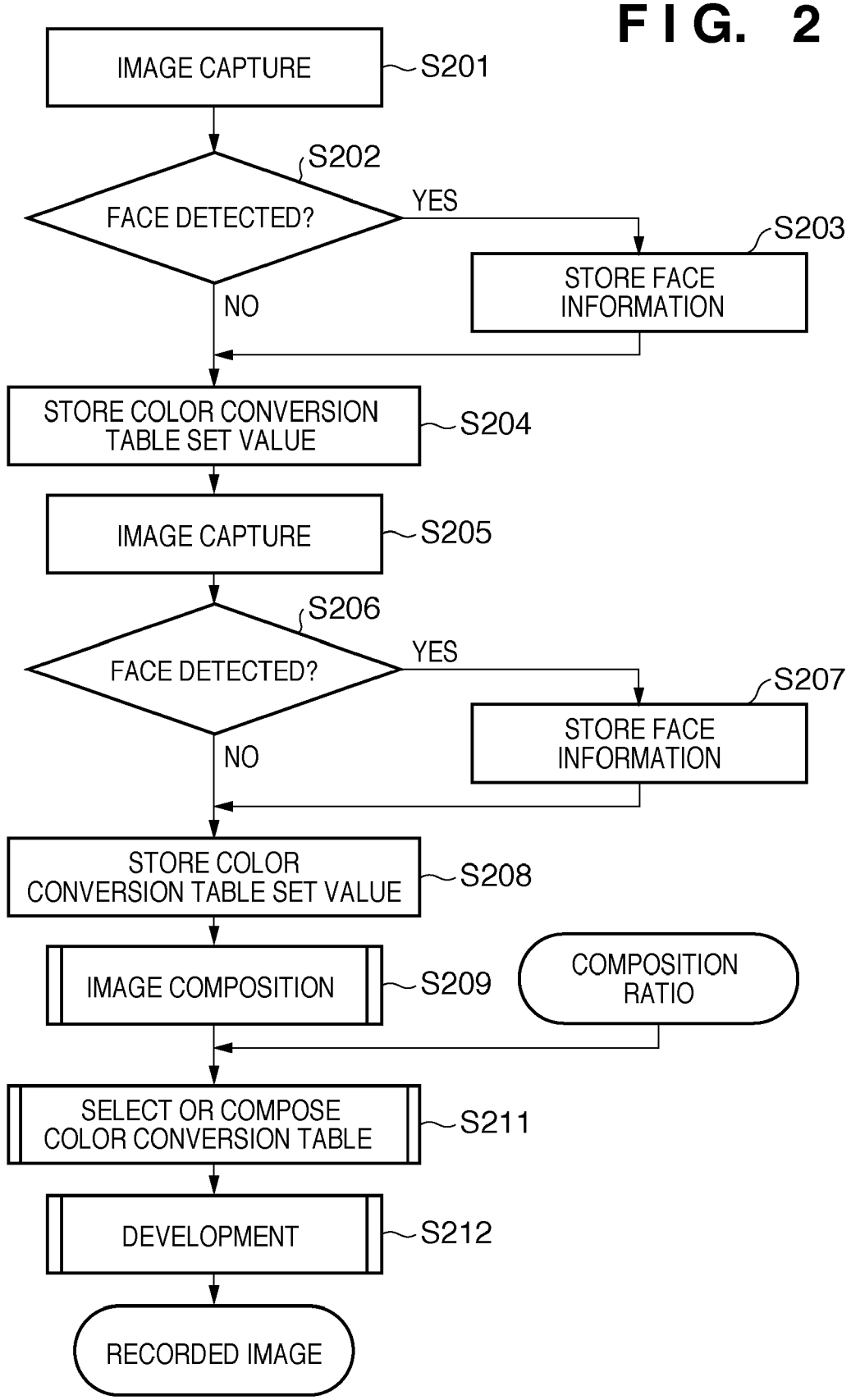
FIG. 2 is a flowchart showing an operation to capture plural images and compose them for multiple exposure in a case where a color conversion table is composed as a developing parameter.

FIG. 2 is a flowchart showing an operation to capture plural images and compose them for multiple exposure in a case where a color conversion table is composed as a developing parameter. Further, the number of images to be composed is two. That is, in FIG. 2, image capture by the image capture unit 101 in FIG. 1 is performed at steps S201 and S205, that is, the image capture is performed twice.

First, at step S201, image capture is performed by the image capture unit 101, then at step S202, it is determined whether or not a face has been detected in the image captured at step S201. The face detection is performed by utilizing image capturing information obtained from the image capturing information acquisition unit 104 or information obtained by the image analysis unit 106 from the captured image. When it is determined at step S202 that a face has been detected, the process proceeds to step S203, at which face information indicating the existence/absence of face, the position of the face, the size of the face, the image from which the face has been detected, is stored in the memory 105. Further, at step S204, the color conversion table set value obtained by the image capturing information acquisition unit 104 is stored in the memory 105. Then the process proceeds to step S205. When it is determined at step S202 that a face has not been detected, the color conversion table set value obtained with the image capturing information acquisition unit 104 is stored in the memory 105 at step S204, then the process proceeds to step S205. From step S205 to step S208, the same processing as that from step S201 to step S204 is performed.

At step S209, the image composition unit 110 performs image combining, then selection or composition of a color conversion table is performed at step S211 using the developing parameter composition ratio obtained by the composition ratio determination unit 108. Upon selection or composition of a color conversion table at step S211, when, for example, at least one captured image where a face has been detected exists, a color conversion table appropriate to portrait image can be applied.

Further, a color conversion table LUTm, formed by composing plural color conversion tables LUT1 and LUT2 as in the following expression, can be applied.

$$LUTm(R,G,B)=\alpha LUT1(R,G,B)+(1-\alpha)LUT2(R,G,B)$$

$\alpha$ is a composition ratio for the first captured image.

At step S212, development processing is performed by the development processing unit 111 using the composite color conversion table generated as above as a developing parameter, and a record image is obtained.

In this manner, as one developing parameter is generated by referring to plural image capturing information, even in a case where a landscape is image-captured as a first image in multiple exposure image capture then a person is image-captured as second and third images, an appropriate developing parameter can be set. For example, by selecting portrait as a developing parameter, not development processing specialized for the landscape as the first image but development processing appropriate to the second and third portrait images in which a person is captured can be performed.

Figure 3:
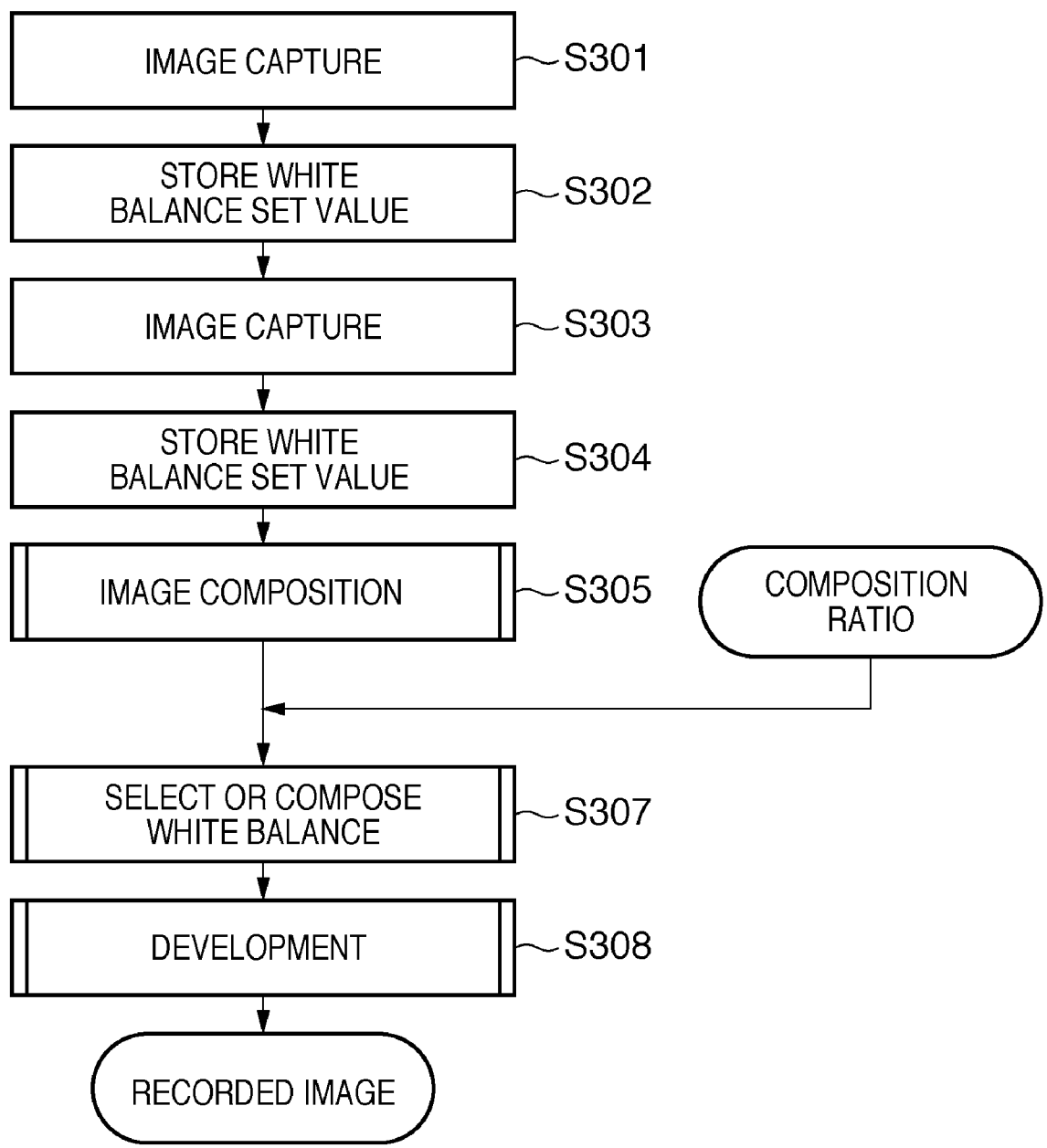
FIG. 3 is a flowchart showing an operation to capture plural images and compose them for multiple exposure in a case where a white balance value is composed as a developing parameter.

FIG. 3 is a flowchart showing an operation to capture plural images and compose them for multiple exposure in a case where a white balance value is composed as a developing parameter. Further, in this case, the number of composed images is two. That is, in FIG. 3, image capture by the image capture unit 101 in FIG. 1 is performed at steps S301 and S303, that is, performed twice.

When image capture is performed at step S301, then at step S302, a white balance set value is stored together with the captured image into the memory 105, and the process proceeds to step S303. When image capture is performed at step S303, similarly, a white balance set value is stored together with the captured image into the memory 105 at step S304, and the process proceeds to step S305. At step S305, the image composition unit 110 performs image composition, then at step S307, selection or composition of a white balance value is performed using the developing parameter composition ratio obtained by the composition ratio determination unit 106. Note that upon acquisition of composition ratio, similar processing to that in the color conversion table can be performed.

Further, it may be arranged such that a color temperature Tm is calculated as in the following expression and applied as a weighted average from plural color white balance temperatures T1 and T2 in accordance with a composition ratio.

$$Tm = \alpha T1 + (1-\alpha)T2$$

Figure 4:
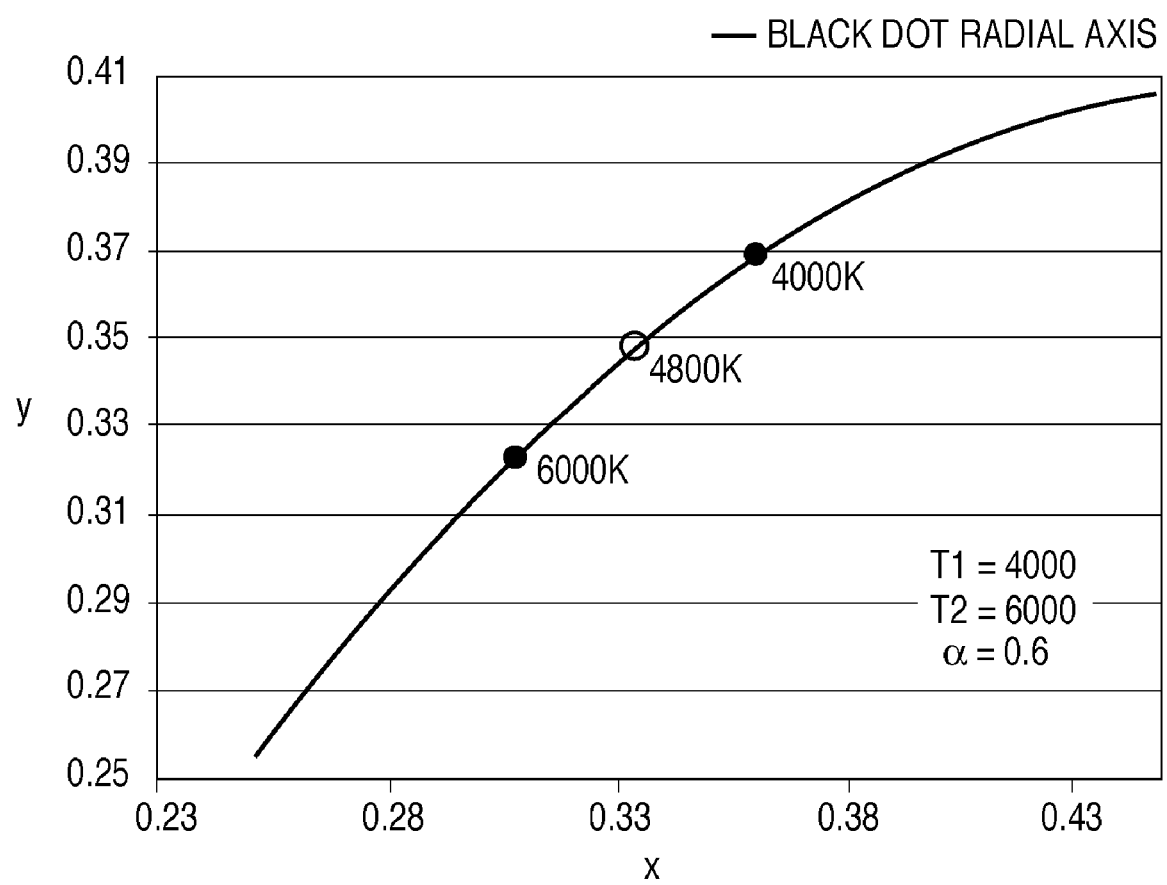
FIG. 4 is a graph showing an example of white balance setting.

Note that $\alpha$ is a composition ratio for the first captured image. For example, when T1 is 4000K, T2, 6000K and $\alpha$ is 0.6, a white balance value corresponding to 4800K is selected as shown in FIG. 4. At step S308, the development processing unit 111 performs development processing using the generated white balance value as a developing parameter, and a record image is obtained.

In this manner, as one developing parameter is generated by referring to plural image capturing information, even when plural captured images are obtained with different white balance set values, an appropriate developing parameter can be set. Further, as a weighted average of plural white balance values is calculated in accordance with a composition ratio, not development processing specialized for the first captured image but development processing appropriate to a composite image can be performed.

Second Embodiment

Figure 5:
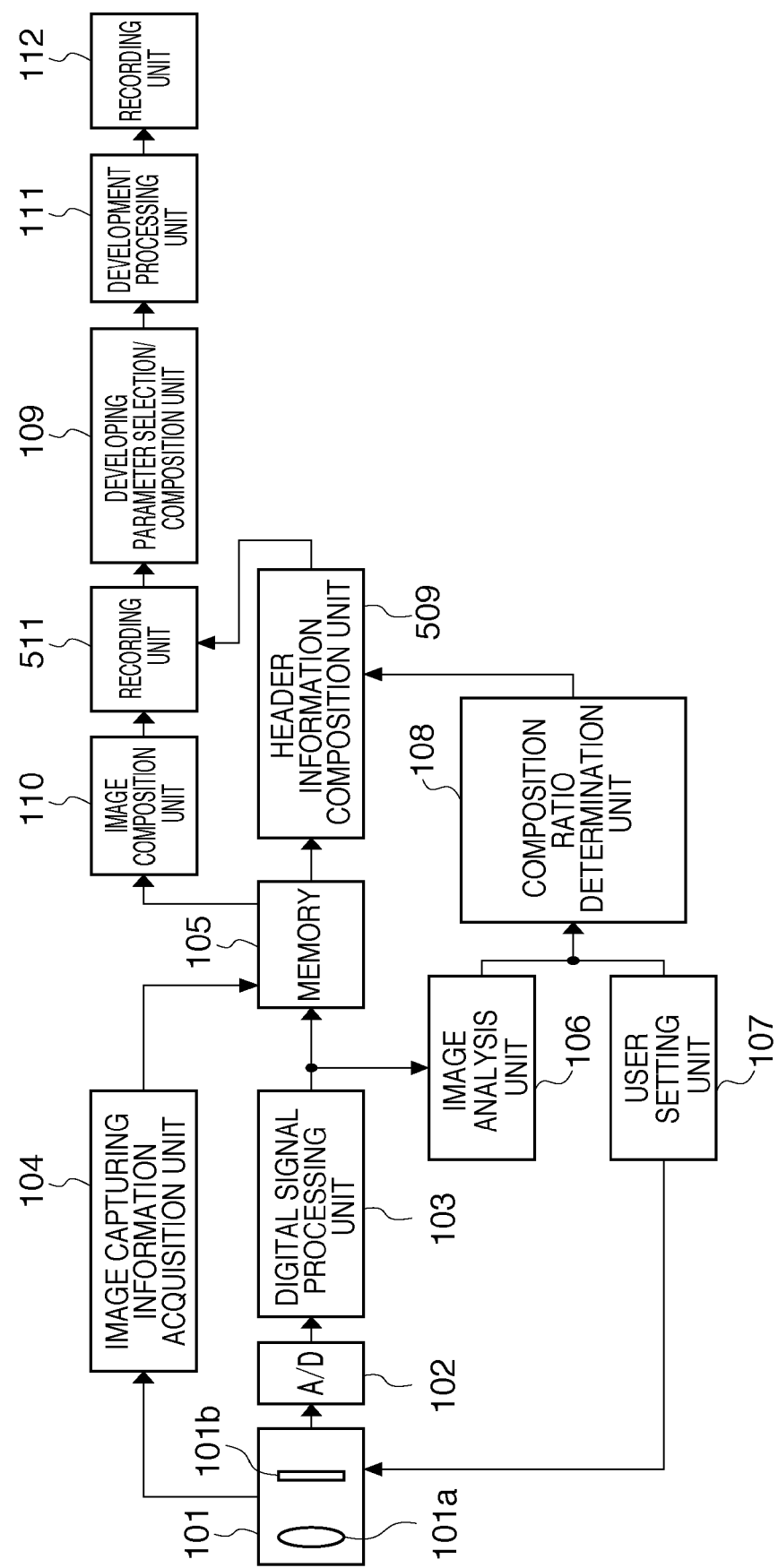
FIG. 5 is a block diagram showing a configuration of the image capture apparatus according to a second embodiment of the present invention.

FIG. 5 is a block diagram showing a configuration of the image capture apparatus according to a second embodiment of the present invention. In the second embodiment, information necessary for determination of a developing parameter is included in a header of composite RAW image data before development and the composite RAW image data is recorded. For this purpose, in addition to the configuration in the first embodiment shown in FIG. 1, a header information composition unit 509 and a recording unit 511 to record the composite RAW image data together with the composite header information are provided. Since the other constituent elements are the same as those in the first embodiment, the same elements have the same reference numerals.

Figure 6:
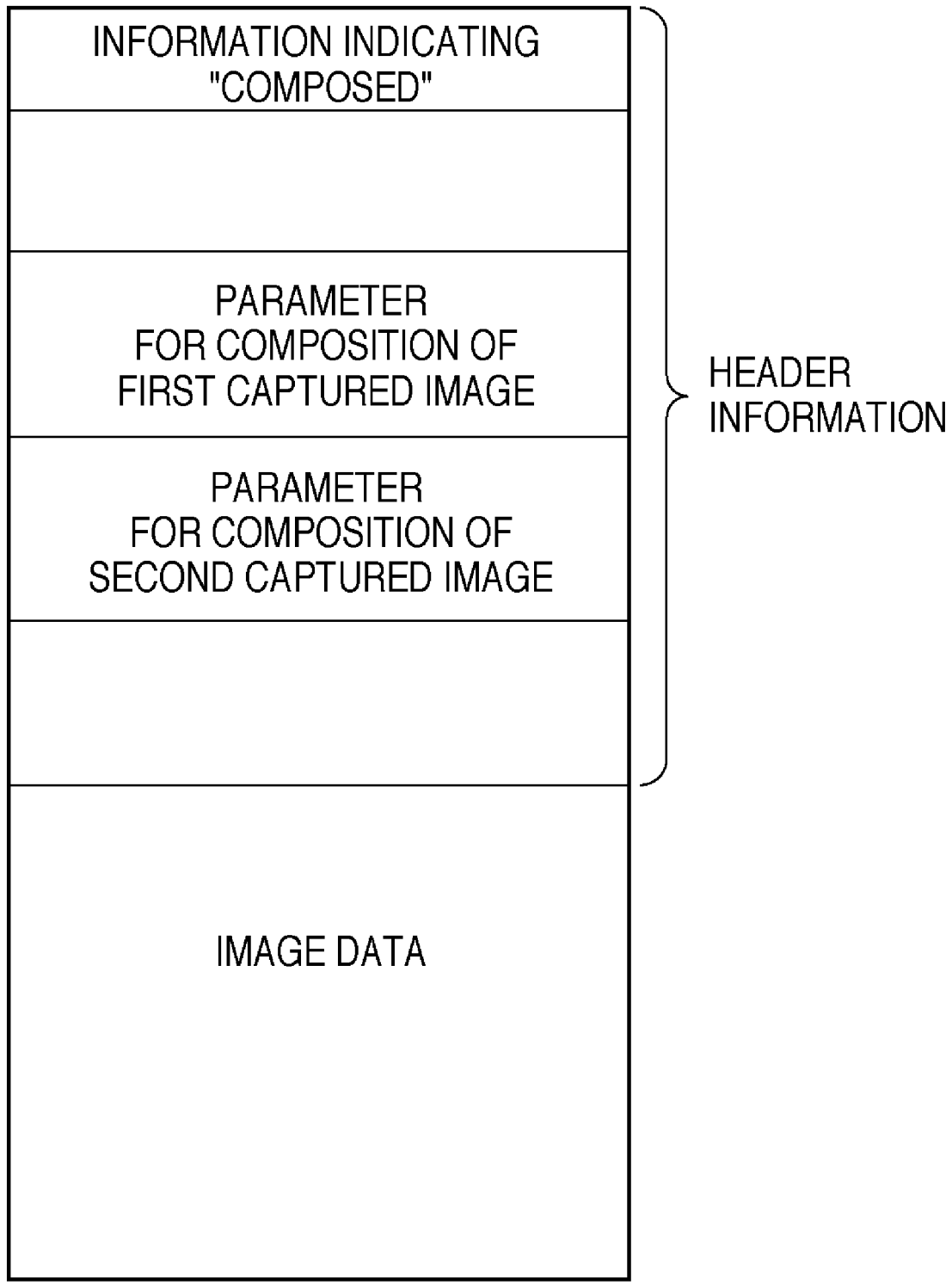
FIG. 6 is a table showing an example of a header format in the second embodiment of the present invention.

In the case of the present embodiment, the header information of the composite RAW image data before development is as shown in FIG. 6. In FIG. 6, as a composition parameter, parameters necessary for determination of a developing parameter such as face information, a color conversion table set value, a white balance set value and the like are recorded.

Hereinbelow, a particular example upon writing of header information as shown in FIG. 6 will be described using FIG. 5. First, processings by the image capture unit 101 to the composition ratio determination unit 108 are the same as those in FIG. 1. In the header information composition unit 509, upon composition of header information, first, information indicating "composed" is written in the header information, and parameters for composition of respective captured images are written in other positions in the header. The composite header information is associated with the composite RAW image data obtained by the image composition unit 110 and recorded.

In the developing parameter selection/composition unit 109, when the information indicating "composed" is read, a composition parameter is read from the stored header information and selection or composition of developing parameter is performed. The development processing unit 111 performs development using the developing parameter obtained as above, and the recording unit 112 records a developed image.

As described above, the composite header information is associated with the composite RAW image data and stored, thereby selection or composition of a color conversion table and a white balance upon development processing can be performed while a composition ratio is newly controlled.

Other Embodiment

In the above-described second embodiment, the image capture apparatus itself performs parameter composition and development with respect to RAW image data recorded by the recording unit 511, however, the present invention is not limited to this arrangement. For example, it may be arranged such that application software operating on a personal computer has functions of the developing parameter selection/composition unit 109, the development processing unit 111, the image analysis unit 106, the composition ratio determination unit 108 and the like.

In this case, software (program) to realize the functions of the above-described embodiments is supplied to a system or an apparatus (for example, a personal computer) via a network or various storage media, and a computer (or a CPU or an MPU) of the system or apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-156324, filed Jun. 30, 2009 which is hereby incorporated by reference herein in its entirety.

What is claimed is:

1. An apparatus comprising:
   an image capture unit to capture an object image;
   an acquisition unit to acquire a developing parameter for image data captured by said image capture unit;
   an analysis unit to analyze RAW image data generated by said image capture unit;
   a first composition unit to compose a plurality of RAW image data generated by said image capture unit and generate composite RAW image data;
   a determination unit to determine a composition ratio for a plurality of developing parameters respectively for development of said plurality of RAW image data acquired by said acquisition unit in accordance with a result obtained from said analysis unit or a user's setting;

a second composition unit to compose the plurality of developing parameters acquired by said acquisition unit based on said composition ratio for the plurality of developing parameters determined by said determination unit and generate one composite developing parameter; and a development unit to develop the composite RAW image data composed by said first composition unit using the composite developing parameter generated by said second composition unit.

2. The apparatus according to claim 1, wherein said analysis unit detects a face of an object person.

3. The apparatus according to claim 1, wherein said developing parameter includes a color conversion table.

4. The apparatus according to claim 1, wherein said developing parameter includes a white balance value.

5. The apparatus according to claim 1, wherein said developing parameter is determined in accordance with an information of said RAW image data, and said information of said RAW image data includes at least one of existence/absence of a face, a face position, a face size, a color conversion table set value, a white balance set value, thumbnail information, exposure time, an aperture value, an image capture mode, an ISO film speed value, a shutter speed, a light control correction value, an exposure correction value, lens information, a distance to an object and a flash status.

6. A method of generating a composite image data developed from a composite RAW image data, said method comprising:

an acquisition step of an acquisition unit acquiring a developing parameter for developing RAW image data;

an analysis step of an analysis unit analyzing RAW image data;

a first composition step of a first composition unit composing a plurality of RAW image data and generate composite RAW image data;

a determination step of a determination unit determining a composition ratio for a plurality of developing parameters respectively for development of said plurality of RAW image data acquired in said acquisition step in accordance with a result obtained from said analysis step or a user's setting;

a second composition step of a second composition unit composing the plurality of developing parameters acquired in said acquisition step based on said composition ratio for the plurality of developing parameters determined in said determination step and generate one composite developing parameter; and a development step of a development unit developing the composite RAW image data composed in said first composition step using the composite developing parameter generated in said second composition step.

\* \* \* \* \*